(12) United States Patent  
Frazier et al.

(10) Patent No.: US 8,130,441 B2
(45) Date of Patent: Mar. 6, 2012

(54) ELECTROPHORETIC LIGHT MODULATOR

(75) Inventors: Gary A. Frazier, Garland, TX (US); Catherine Trent, Allen, TX (US)

(73) Assignee: Raytheon Company, Waltham, MA (US)

( * ) Notice: Subject to any disclaimer, the term of this patent is extended or adjusted under 35 U.S.C. 154(b) by 255 days.

(21) Appl. No.: 12/367,288

(22) Filed: Feb. 6, 2009

(65) Prior Publication Data
US 2009/0201570 A1 Aug. 13, 2009

Related U.S. Application Data

(60) Provisional application No. 61/027,292, filed on Feb. 8, 2008.

(51) Int. Cl.
*G02B 26/00* (2006.01)

(52) U.S. Cl. ..................................................... 359/296

(58) Field of Classification Search ........... 359/290–296
See application file for complete search history.

(56) References Cited

U.S. PATENT DOCUMENTS

| 3,756,693 | A | * | 9/1973 | Ota ................................. 345/107 |
| 4,741,988 | A | | 5/1988 | Van der Zande et al. ..... 430/312 |
| 5,784,189 | A | | 7/1998 | Bozler et al. |
| 6,117,368 | A | | 9/2000 | Hou ................................. 252/572 |
| 6,136,551 | A | | 10/2000 | Aoki et al. |
| 6,166,787 | A | | 12/2000 | Akins et al. |
| 6,422,687 | B1 | | 7/2002 | Jacobson |
| 7,283,119 | B2 | * | 10/2007 | Kishi ............................ 345/107 |
| 7,701,435 | B2 | | 4/2010 | Hiramatsu |
| 7,701,436 | B2 | | 4/2010 | Miyasaka |
| 7,701,476 | B2 | | 4/2010 | Brown Elliott et al. |
| 7,704,573 | B2 | | 4/2010 | Itami et al. |
| 7,706,051 | B2 | | 4/2010 | Hattori et al. |
| 7,706,052 | B2 | | 4/2010 | Kang et al. |
| 7,710,388 | B2 | | 5/2010 | Hirata et al. |
| 7,710,389 | B2 | | 5/2010 | Kazmaier et al. |
| 7,710,528 | B2 | | 5/2010 | Hasegawa et al. |

FOREIGN PATENT DOCUMENTS

EP 0 783 163 A1 12/1996

OTHER PUBLICATIONS

PCT Notification of Transmittal of the International Search Report and the Written Opinion of the International Searching Authority, or the Declaration mailed Mar. 26, 2009 with regard to Intl. Appln. No. PCT/US2009/033418, filed Feb. 6, 2009, Mar. 26, 2009.

* cited by examiner

*Primary Examiner* — Scott J Sugarman
*Assistant Examiner* — Vipin Patel
(74) *Attorney, Agent, or Firm* — Baker Botts L.L.P.

(57) ABSTRACT

An electrophoretic light modulator includes a plurality of similarly charged particles comprising a first optical characteristic. The electrophoretic light modulator also includes at least one reflecting surface comprising a second optical characteristic different that the first optical characteristic. The electrophoretic light modulator further includes a pair of electrodes that create an electric field that causes the plurality of charged particles to obscure or expose the reflecting surface based on the polarity of the electric field.

24 Claims, 13 Drawing Sheets

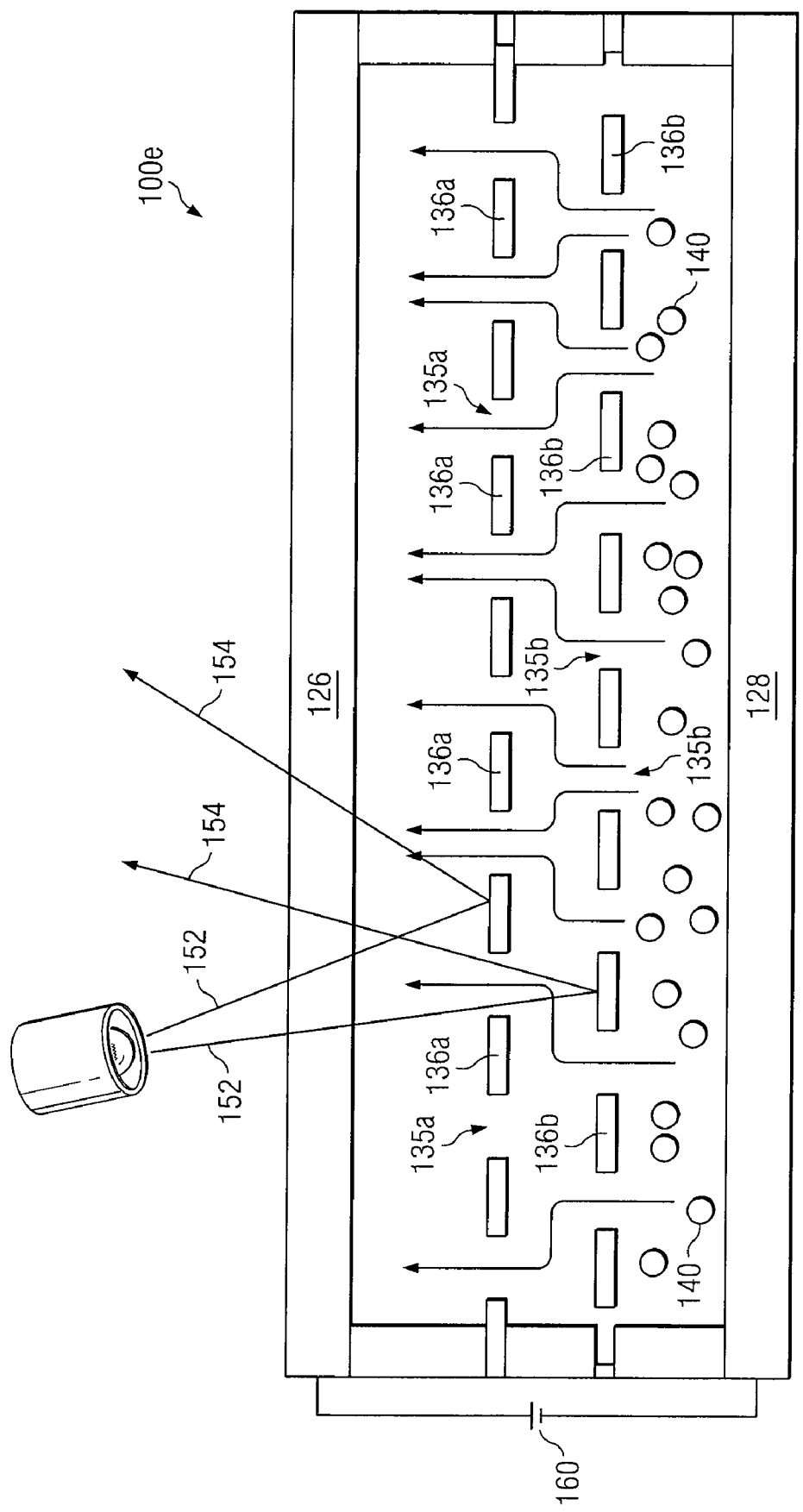

ELECTROPHORETIC LIGHT MODULATOR

CROSS REFERENCE TO RELATED APPLICATION

This Application claims the benefit of priority under 35 U.S.C. §119(e) of U.S. Provisional Patent Application Ser. No. 61/027,292 filed Feb. 8, 2008.

TECHNICAL FIELD OF THE DISCLOSURE

The present invention relates generally to light modulators, and more particularly, to an electrophoretic light modulator.

BACKGROUND OF THE DISCLOSURE

It is generally useful to provide an electronic means to modulate the intensity of optical radiation. Applications of such modulators include, for example, spatial light modulators, optical displays, and other similar applications. Examples of light modulators include liquid crystal, electrochromic, electromechanical, Bragg, and other technologies. Liquid crystal modulators rely on rotating a plane of polarization of incident light to modulate light. Electrochromic modulators inject ions into (or out of) a material such that the material changes from being optically transparent to optically absorbing. A back reflector (e.g., a metal mirror) is placed behind this material so that light may either be reflected by the reflector or absorbed by the electrochromic layer. The mirror is perforated so that ions may pass through the mirror. Depending on the application, moving the ions may require a large amount of energy and the rate of change is relatively slow (around 1 Hz).

An electrophoretic modulator is another type of light modulator. A typical electrophoretic modulator uses two differently charged particles of two different colors. An electric force is applied to the particles to cause the particles of one color to move toward a viewing surface and particles of the other color to move away from the viewing surface. By alternating the electric force the color of the viewing surface may alternate between the two colors.

SUMMARY OF THE DISCLOSURE

In accordance with particular embodiments, an electrophoretic light modulator includes a plurality of similarly charged particles comprising a first optical characteristic. The electrophoretic light modulator also includes at least one reflecting surface comprising a second optical characteristic different that the first optical characteristic. The electrophoretic light modulator further includes a pair of electrodes that create an electric field that causes the plurality of charged particles to obscure or expose the reflecting surface based on the polarity of the electric field.

Technical advantages of particular embodiments include the ability to modulate light across a wide range of optical frequencies. Another technical advantage of particular embodiments includes providing the ability to modulate light with a relatively high degree of contrast. Accordingly, light may be reflected with controllable intensity.

Other technical advantages may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete understanding of particular embodiments of the disclosure will be apparent from the detailed description taken in conjunction with the accompanying drawings in which:

FIG. 5A is a side elevational view of an electrophoretic light modulator comprising two perforated sheets in which particles are moving above the perforated sheets, in accordance with particular embodiments;

DETAILED DESCRIPTION OF EXAMPLE EMBODIMENTS

FIGS. 1-4 depict different views of various electrophoretic light modulators. The electrophoretic light modulators may be formed by suspending electrically charged particles within a fluid. The particles may be suspended between electrodes positioned to create an electric field. By subjecting the charged particles to an electric field the particles can be made to move towards or away from one or the other of the electrodes. This may cause the particles to either cover or expose a reflecting surface. The materials of the surface and particles may be selected for their affect on incident light. Thus, if the electrophoretic light modulator is designed to modulate between red and green, then the particles and surface may be selected based on their ability to reflect red and green light. More specifically, in one state the modulator may cause a plurality of green particles to move to the viewable surface, obscuring a reflecting surface, thus causing the modulator to reflect green light; then in a second state the modulator may cause the particles to expose the red reflecting surface thus causing the modulator to reflect red light. The modulation, regardless of the desired color or spectrum range, may occur at rates that exceed video rates (e.g., 30 Hz). Furthermore, in particular embodiments, pixels may be created as arrays of independent electrodes and reflective materials of varied color so as to produce a colorful optical display.

Figure 1A:
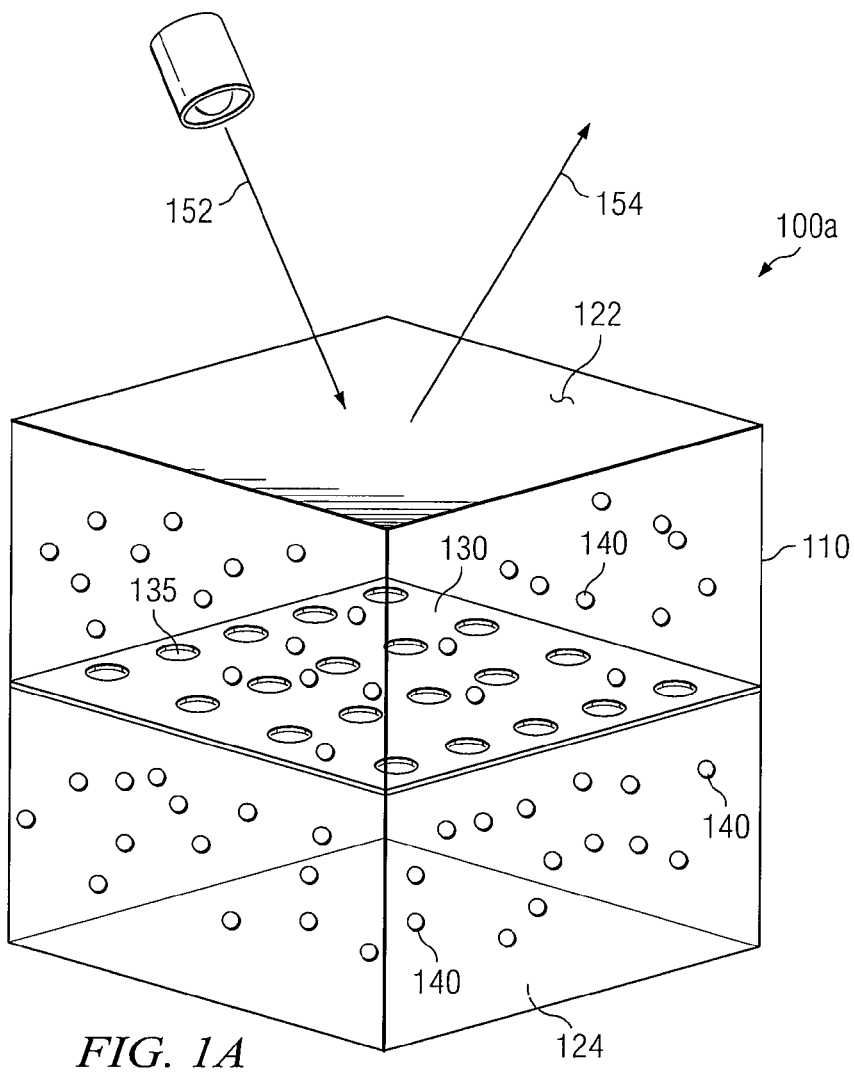
FIG. 1A is a perspective view an electrophoretic light modulator comprising a perforated sheet, in accordance with particular embodiments.
Figure 1B:
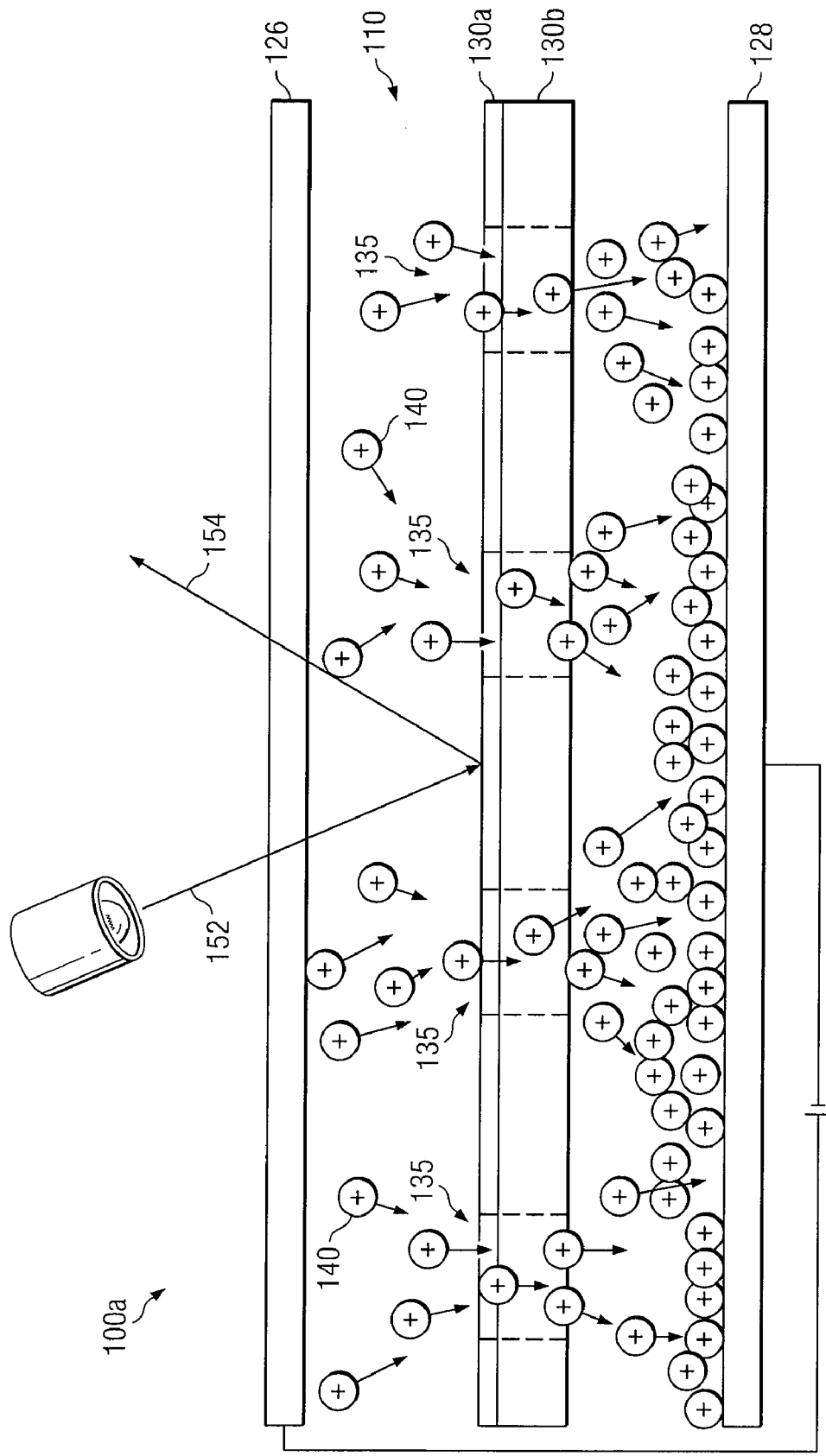
FIG. 1B is a side elevational view of the electrophoretic light modulator comprising a perforated sheet in which particles are moving under the perforated sheet, in accordance with particular embodiments.
Figure 1C:
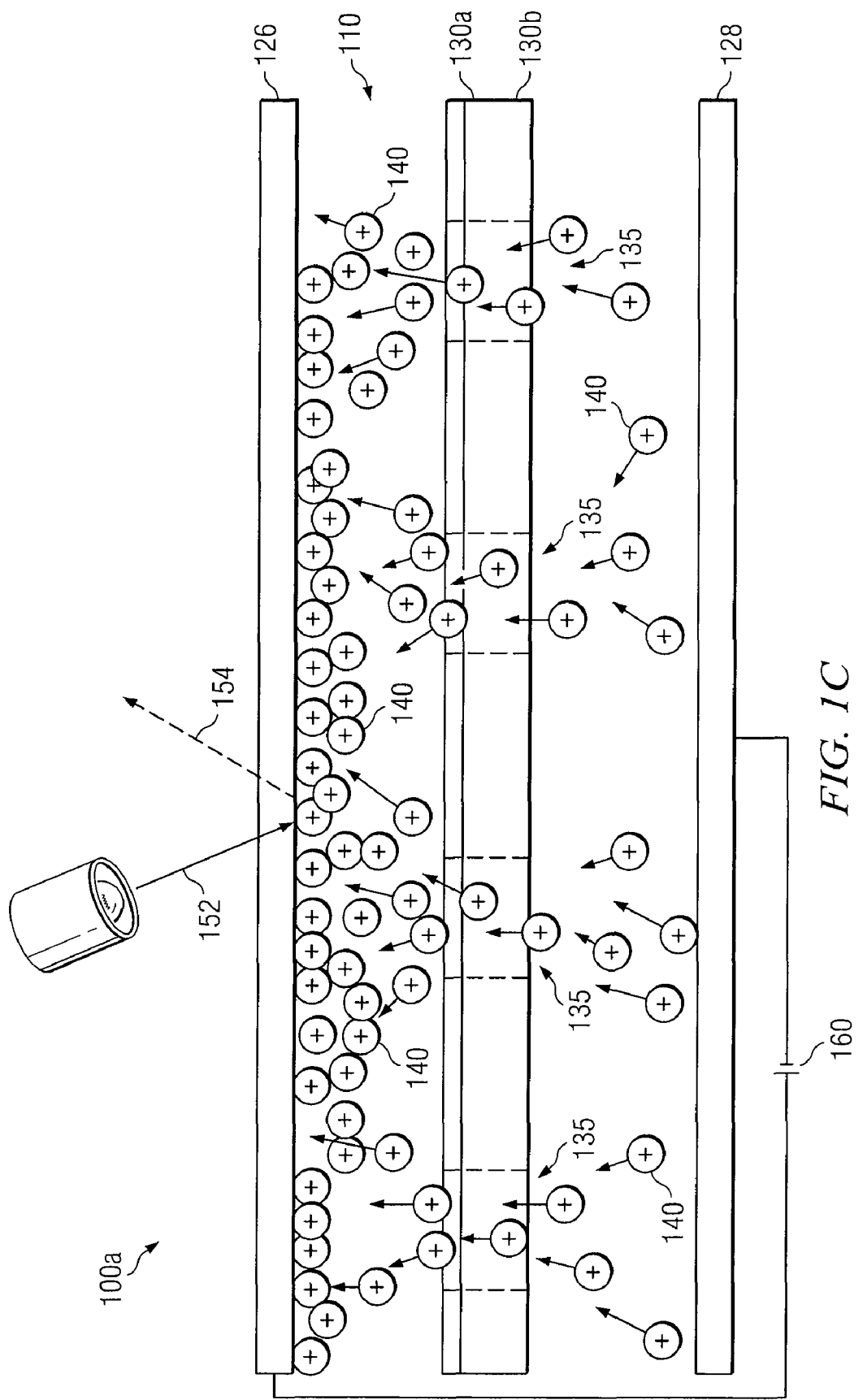
FIG. 1C is a side elevational view of the electrophoretic light modulator comprising a perforated sheet in which particles are moving above the perforated sheet, in accordance with particular embodiments.

FIGS. 1A-1C depict various views of a particular embodiment that uses a perforated sheet for a reflecting surface. In particular, FIG. 1A is a perspective view electrophoretic light modulator 100a comprising perforated sheet 130, in accordance with particular embodiments. In the depicted embodiment, light modulator 100a comprises upper surface 122 and lower surface 124. These surfaces border a void between two electrodes (not depicted) that is filled with electrophoretic fluid 110. Within the void is perforated sheet 130. Perforations 135 in the intervening perforated sheet 130 may allow charged electrophoretic particles 140 to pass through perforated sheet 130 and come to rest on either upper surface 122 or lower surface 124. The motion of particles 140 may be controlled by an electrical bias provided by the two electrodes. Thus, by changing the bias of the two electrodes, particles 140 may either expose or shield perforated sheet 135 from incident light 152. This, in turn, may affect the characteristics of reflected light 154.

The material used for perforated sheet 130 may have an impact on the overall performance of light modulator 100a and may vary greatly depending on the intended application and/or desired results. For example, depending on the embodiment, perforated sheet 130 may comprise a metal film (e.g., aluminum) deposited (e.g., 0.2 to 3.0 microns thick) onto a sheet of plastic, a film of material with a high index of optical refraction (e.g., it acquires high reflectivity by virtue of the refractive index discontinuity with fluid 110), or a multilayer composite of materials designed to reflect light in a specific spectral band (e.g., a multilayer interference filter). Besides reflectivity, in some embodiments, perforated sheet 130 may include a colored metallic or non-metallic film that may allow the modulator to provide a surface having a specific color.

The material used for particles 140 may also have an impact on the overall performance of light modulator 100a and may vary greatly depending on the intended application and/or desired result. The materials may affect one or more characteristics of particles 140, such as the charge of the particles, the size of the particles, the color of the particles, and any other characteristics that may affect the way light 152 is modulated.

In some embodiments, particles 140 may comprise particles of doped silicon electrified to act as electrophoretic particles. Carbon may be another material of choice for particles 140. Carbon may be easily charged electrically and is a well known electrophoretic material. Carbon may have a strong optical absorption characteristic over a very wide spectral band so that electrophoretic carbon may be used over a range of wavelengths spanning the visible spectrum through radio frequencies. In certain embodiments, the carbon may be coated with a polymer material that may be any of variety of different colors, such as black, red, green, blue, etc. Other particles that may make for useful electrophoretic materials include metal spheres, metallized dielectrics, planar metal sheets, particles having a relatively high dielectric constant that may have essentially no optical absorption, and the like. As mentioned above, in particular embodiments, particles 140 may comprise color. Thus, when used with a colored perforated sheet 130, light modulator 100a may be able to switch between two color states: that of particles 140 and that of perforated sheet 130.

Because of the size (e.g., approximately 0.03 microns in diameter) and shape of particles 140 they may tend to scatter incident light in a non-specular manner. This may make it difficult to obtain mirror-like reflections. However, these same small particles may be well suited to providing diffuse scattering and/or optical absorption. Thus, when designing light modulator 100a it may be desirable to use particles 140 to remove optical energy from the system rather than to specularly reflect optical energy within the system. Thus, when used with a highly reflective perforated sheet, light modulator 100a may be able to provide a relatively high contrast.

Perforations 135 may be sized and spaced to allow particles 140 to pass through perforated sheet 130. In particular embodiments, perforations 135 may be relatively small and widely separated so as to reduce their impact on the optical quality of perforated sheet 130. It is generally understood that the modulation bandwidth of a light modulator based on electrophoresis is generally inversely proportional to the size of the individual particles. Thus, it may be desirable to use relatively small particles (e.g., 0.02 to 0.1 micrometers). This may allow for relatively small perforations 135 (e.g., 0.1 to 100 micrometers). In some embodiments, perforations 135 may be approximately ten times the size of particles 140.

Fluid 110 may comprise optically transparent (at least within the desired optical spectrum) fluid that suspends particles 140 between the electrodes. Fluid 110 and particles 140 may be chosen so that particles 140 may move freely under the influence of an applied electric field. In particular embodiments, fluid 110 may help light modulator 100a to be bi-stable in its modulation behavior. In other words, fluid 110 may help particles 140 to remain at one surface or the other even after the electric field has been removed. This may result in a relatively low level of electrical power consumption. In particular embodiments, fluid 110 may be made of a relatively low dielectric, transparent material having a relatively high molecular weight, such as hexane or decane. The relatively low dielectric properties of fluid 110 may help in the distribution of the electric field used to move particles 140.

FIG. 1B is a side elevational view of electrophoretic light modulator 100a comprising perforated sheet 130 in which particles 140 are moving under perforated sheet 130, in accordance with particular embodiments. Light modulator 100a comprises upper electrode 126 and lower electrode 128. These two electrodes may be biased by voltage source 160. The electric field created between electrodes 126 and 128 may cause particles 140 to move towards one or the other of electrodes 126 or 128. In the depicted embodiment, particles 140 are positively charged such that the electric field between electrodes 126 and 128 directs particles 140 towards lower electrode 128 thereby exposing reflecting surface 130a to light 152.

In order for light 152 to be able to reach reflecting surface 130a it may be desirable for electrode 126 to be transparent, at least with respect to the desired spectrum of optical modulation. Furthermore, it may be desirable for upper electrode 126 to be electrically conductive so that it may acquire an electrical charge from voltage source 160. In particular embodiments, electrode 126 may be formed of any electrically conductive material that is optically transparent such as a 200 Angstrom layer of indium-tin-oxide. Indium-tin-oxide may be relatively transparent to light in the visible spectrum. As another example, in some embodiments, electrode 126 may be made of a layer of titanium-oxynitride. Titanium-oxynitride may be relatively transparent over a wide optical range, which may include the infrared spectrum and/or the ultra-violet spectrum.

Lower electrode 128 may be arranged so as to be generally parallel to upper electrode 126. Thus, the gap between lower electrode 128 and upper electrode 126 may remain relatively constant. In particular embodiments, electrode 128 may comprise a surface that matches the surface of reflecting layer 130*a*. Thus, if reflecting layer 130*a* comprises a reflective material, electrode 128 may comprise a reflective material. In particular embodiments, the surface or composition of electrode 128 may not be important with respect to reflected light 154 because in either state (FIG. 1B or FIG. 1C) it may be obscured by particles 140.

Source 160 may comprise a battery or other such voltage source. Source 160 may be able to apply a bias voltage, or electrical difference or potential, between the parallel plate electrodes 126 and 128. More specifically, voltage source 160 may cause electrodes 126 and 128 to acquire different levels of charge. The bias difference may create an electrical field between upper electrode 126 and lower electrode 128. The electric field may drive particles 140 towards the electrode that carries an electrical charge opposite to that of the electrical charge of particles 140. More specifically, the presence of the applied electrical field may cause particles 140, suspended in fluid 110, to undergo a real force of magnitude $q*E$ where q is the net charge on particles 140 and E is the electric field between upper electrode 126 and lower electrode 128. This force may cause the particles to move in the direction that minimizes their electrochemical potential (e.g., towards one of electrodes 126 or 128). Reversing the polarity of the electrical bias may reverse the sign of the electric field causing particles 140 to move in the opposite direction toward upper electrode 126 (as illustrated in FIG. 1C). Accordingly, particles 140 may pass though perforations 135 and deposit in close-packed fashion onto upper electrode 126.

Perforated sheet 130 comprises two layers, reflecting layer 130*a* and support layer 130*b*. Reflecting layer 130*a* may be a thin metal layer designed to reflect a broad spectrum of light. Other embodiments may comprise reflecting layers made of different materials or colors. In particular embodiments, reflecting layer 130*a* may not be connected electrically to either upper electrode 126 or lower electrode 128. Support layer 130*b* may be an electrically non-conductive support layer for reflecting layer 130*a*. Support layer 130*b* may help to maintain a desired degree of separation between upper electrode 126 and lower electrode 128. In particular embodiments, perforated sheet 130 may carry an induced dipole of charge but may not acquire a net charge due to the charge acquired by the electrodes.

As particles 140 move below perforated sheet 130 they expose the surface of reflecting layer 130*a* to light 152. This may provide a relatively consistent surface for generating reflected light 154. Accordingly, by forming reflecting layer 130*a* out of a thin metal layer, reflected light 154 may comprise a broad spectrum of light that approaches the spectrum and/or intensity of light 152. As a practical matter, some of light 152 may be lost due to particles 140 which may not have made it under perforated sheet 130, and perforations 135 which may allow some light through.

FIG. 1C is a side elevational view of electrophoretic light modulator 100*a* comprising perforated sheet 130 in which particles 140 are moving above perforated sheet 130, in accordance with particular embodiments. In FIG. 1C the bias provided by voltage source 160 was reversed from the bias provided in FIG. 1B. In reversing the bias supplied by voltage source 160, the electric field generated between upper electrode 126 and lower electrode 128 may change direction or sign. This may cause particles 140 to move from their previous state, collected along lower electrode 128 in FIG. 1B, towards electrode 126.

While the charge of upper electrode 126 may be attracting particles 140, it may also be the case that the similar charges of the individual particles 140 are repelling one another. More specifically, because similarly charged objects tend to repel one another, the fact that particles 140 are similarly charged means they may tend to exert repulsive forces on one another. Accordingly, these repulsive forces may cause particles 140 to disperse over the surface of upper electrode 126 so as to minimize their electrostatic potential energy. This may help counteract any tendency for particles 140 to bunch up after passing through widely separated perforations 135.

As particles 140 pass through perforations 135 and collect along the lower surface of upper electrode 126 they may effectively mask perforated sheet 130. Thus, if particles 140 were to be optically absorbing, then in FIG. 1C they would produce a dark or poorly reflecting state in modulator 100*a*. More specifically, by using light absorbing particles 140, reflected light 154 may be relatively weak due to the close-packed array of particles 140 hindering light 152 from reaching reflecting layer 130*a*. Thus, light 152 may be strongly absorbed by the packed particles and the device surface will appear poorly reflecting.

This may be different than the highly reflective state created in FIG. 1B. Thus, the polarity of the electrical bias applied by voltage source 160 may result in a device that presents a viewing surface that is either poorly reflecting or highly reflecting. These states may be switched in a temporal fashion as needed using the correct temporal sequence of changes in the electrical bias provided by voltage source 160. The switching may be done at rates as high as 100 Hz. This may allow the light modulator to electronically control the average intensity of reflected light 154.

While FIGS. 1B and 1C may alternate between a highly reflecting state and a poorly reflecting state, particular embodiments may alternate between different colors (e.g., red particles with a green perforated sheet) depending on the composition of the perforated sheet and the particles.

Figure 2A:
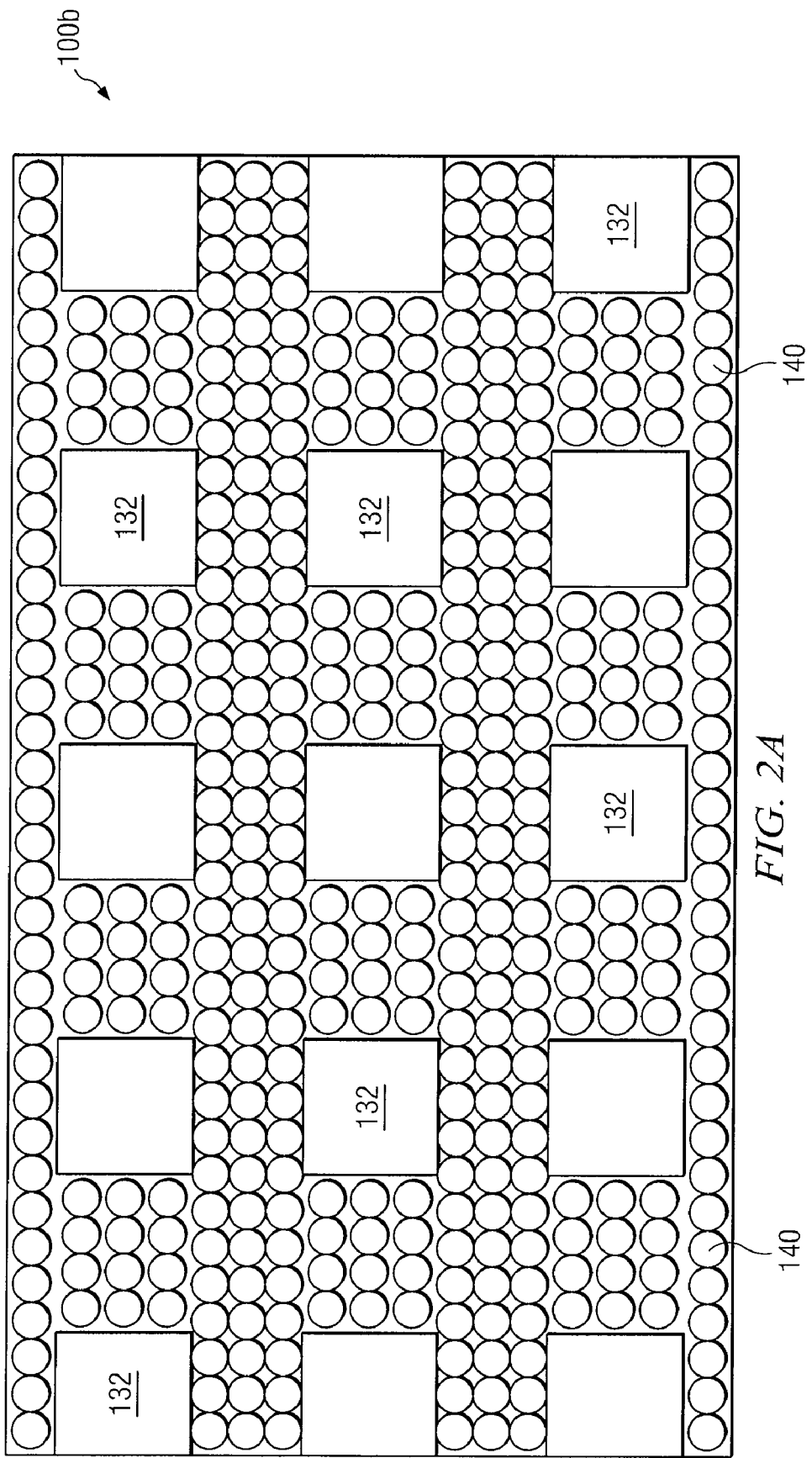
FIG. 2A is a top elevational view of an electrophoretic light modulator comprising an array of posts in which particles have collected between the posts, in accordance with particular embodiments
Figure 2B:
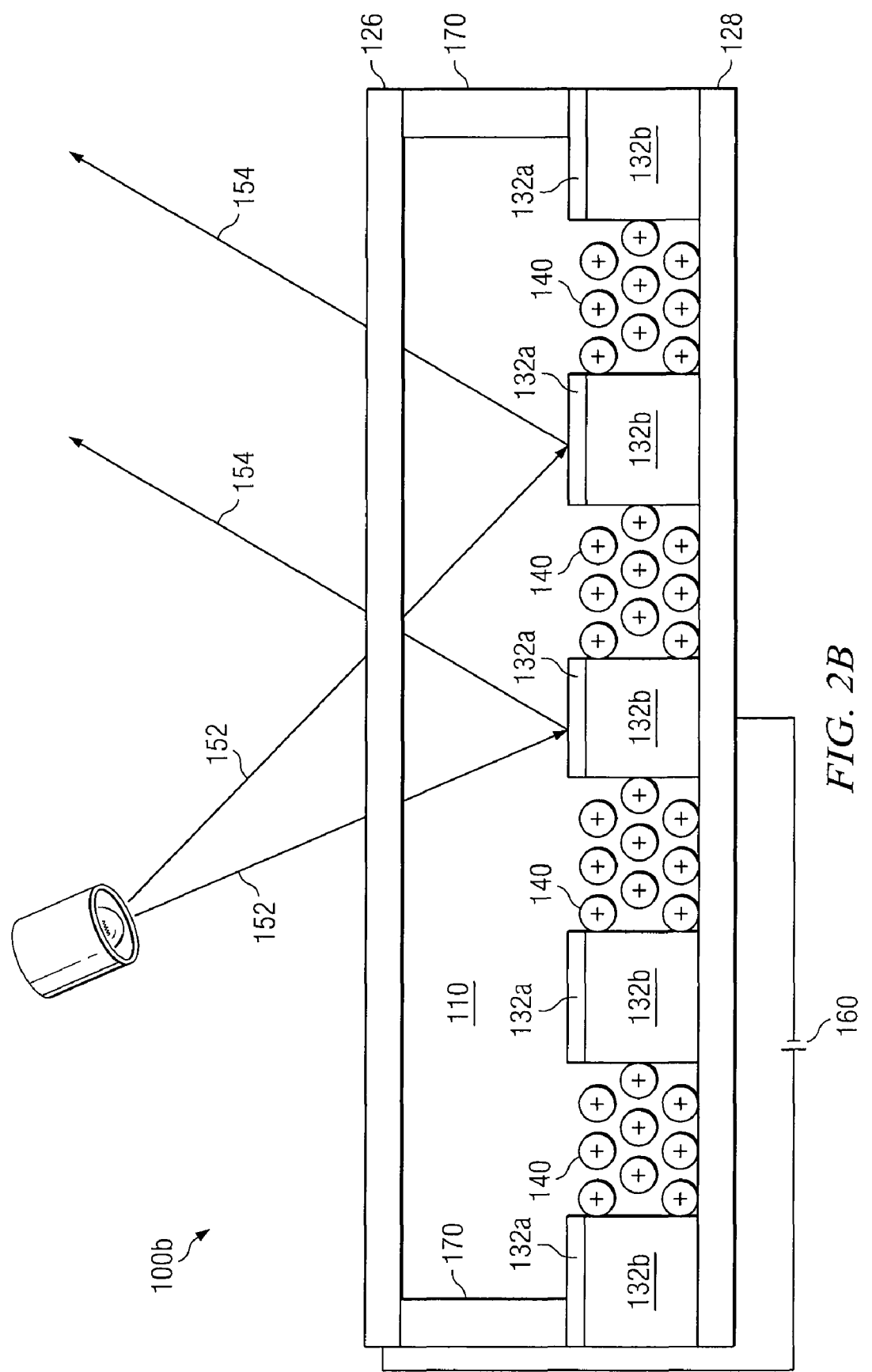
FIG. 2B is a side elevational view of the electrophoretic light modulator comprising an array of posts in which particles have collected between the posts, in accordance with particular embodiments.
Figure 2C:
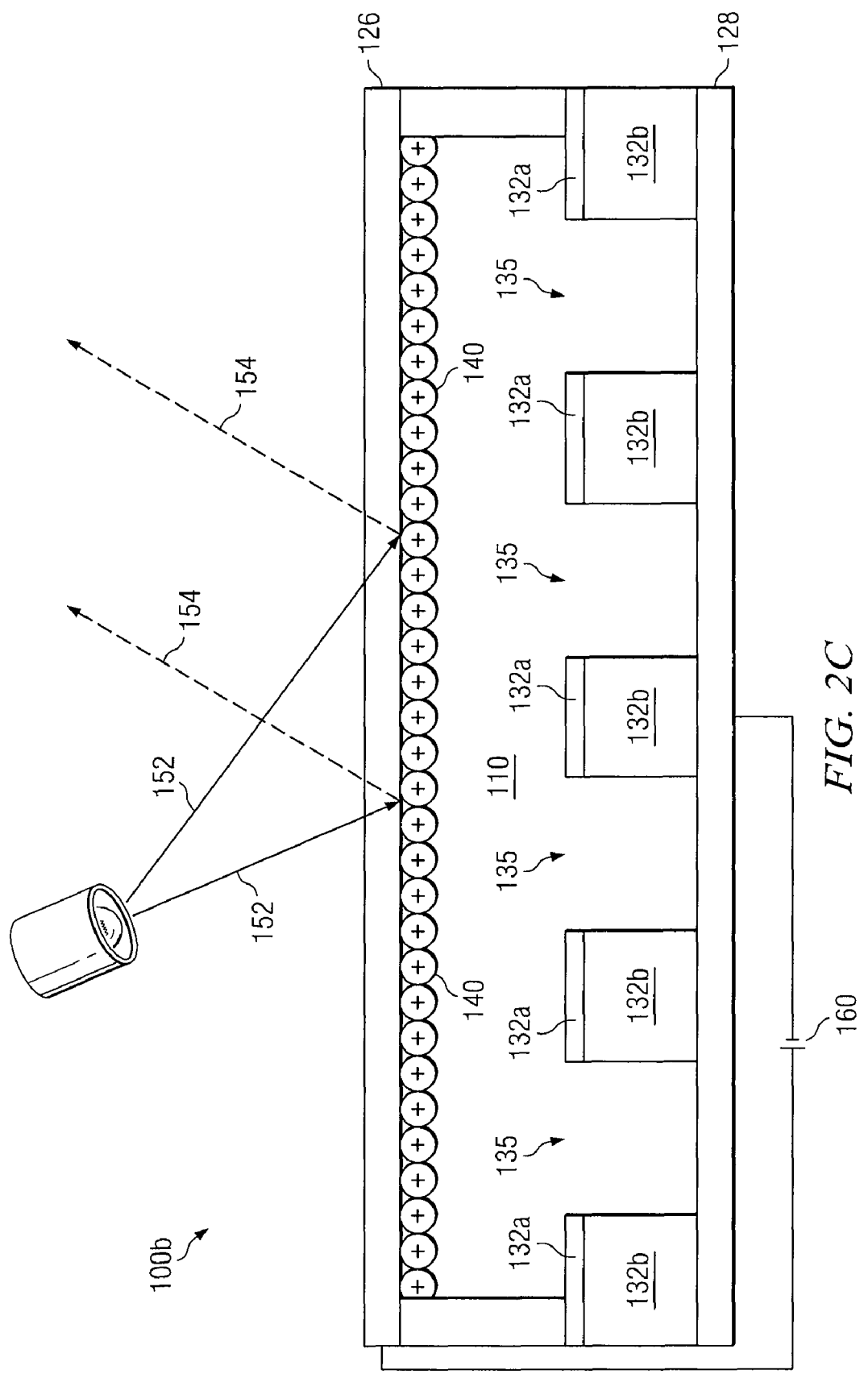
FIG. 2C is a side elevational view of the electrophoretic light modulator comprising an array of posts in which particles have collected above the posts, in accordance with particular embodiments.

FIGS. 2A-2C depict various views of a particular embodiment that uses an array of posts to support a reflecting surface. In particular, FIG. 2A is a top elevational view and FIG. 2B is a side elevational view of electrophoretic light modulator 100*b* comprising an array of posts 132 in which particles have collected between posts 132, in accordance with particular embodiments. Light modulator 100*b*, depicted in FIGS. 2A-2C, may be similar to light modulator 100*a*, depicted in FIGS. 1A-1C, except that perforated sheet 130 may be replaced with an array of posts 132. As particles 140 collect between posts 132 reflecting surfaces 132*a* may become exposed to light 154. As with reflecting surface 130*a* of perforated sheet 130, the composition of reflecting surfaces 132*a* may be selected, depending on operational needs, to reflect a broad spectrum of light, a specific spectrum of light, or particular colors. In other words, reflecting surfaces 132*a* may comprise any of the materials discussed above with respect to reflecting surface 130a. Once reflecting surfaces 132a have been exposed to light 152, reflected light 154 may take on particular characteristics based the composition or material of reflecting surfaces 132a.

The use of posts 132b to support reflecting surface 132a may allow for easier manufacturing (as compared to manufacturing, for example, reflective sheet 130) because it may be simpler to position the reflecting material between electrodes 126 and 128. In particular embodiments, it may be desirable to include a gap between upper electrode 126 and reflecting surface 132a. Among other things, this gap may provide room for particles 140 to spread out along the bottom surface of upper electrode 126.

In the state depicted in FIGS. 2A and 2B particles 140 remain at rest in the gaps between posts 132. Posts 132 may reside on, or be connected to, lower conductor 128. As discussed above, particles 140 may be drawn/pushed into the gaps by an electrical bias supplied by voltage source 160. Once particles 140 are drawn into the gaps, reflecting surface 132a may become exposed, as can be seen in FIGS. 2A and 2B. This may allow light 152 to be reflected, as can be seen in FIG. 2B.

FIG. 2C is a side elevational view of electrophoretic light modulator 100b comprising an array of posts 132 in which particles 140 have collected above posts 132, in accordance with particular embodiments. More specifically, when the electrical bias provided by voltage source 160 is reversed from the bias provided in FIGS. 2A and 2B, particles 140 may move under the resultant electric force out of the gaps between posts 132 and onto the lower surface of upper electrode 126. As more particles 140 reach upper electrode 126, their inherent repulsive forces may cause particles 140 to distribute themselves evenly along the lower surface of upper electrode 126. As mentioned before, fluid 110 may be able to support particles 140 in a steady state when no electrical force is being applied.

Figure 3A:
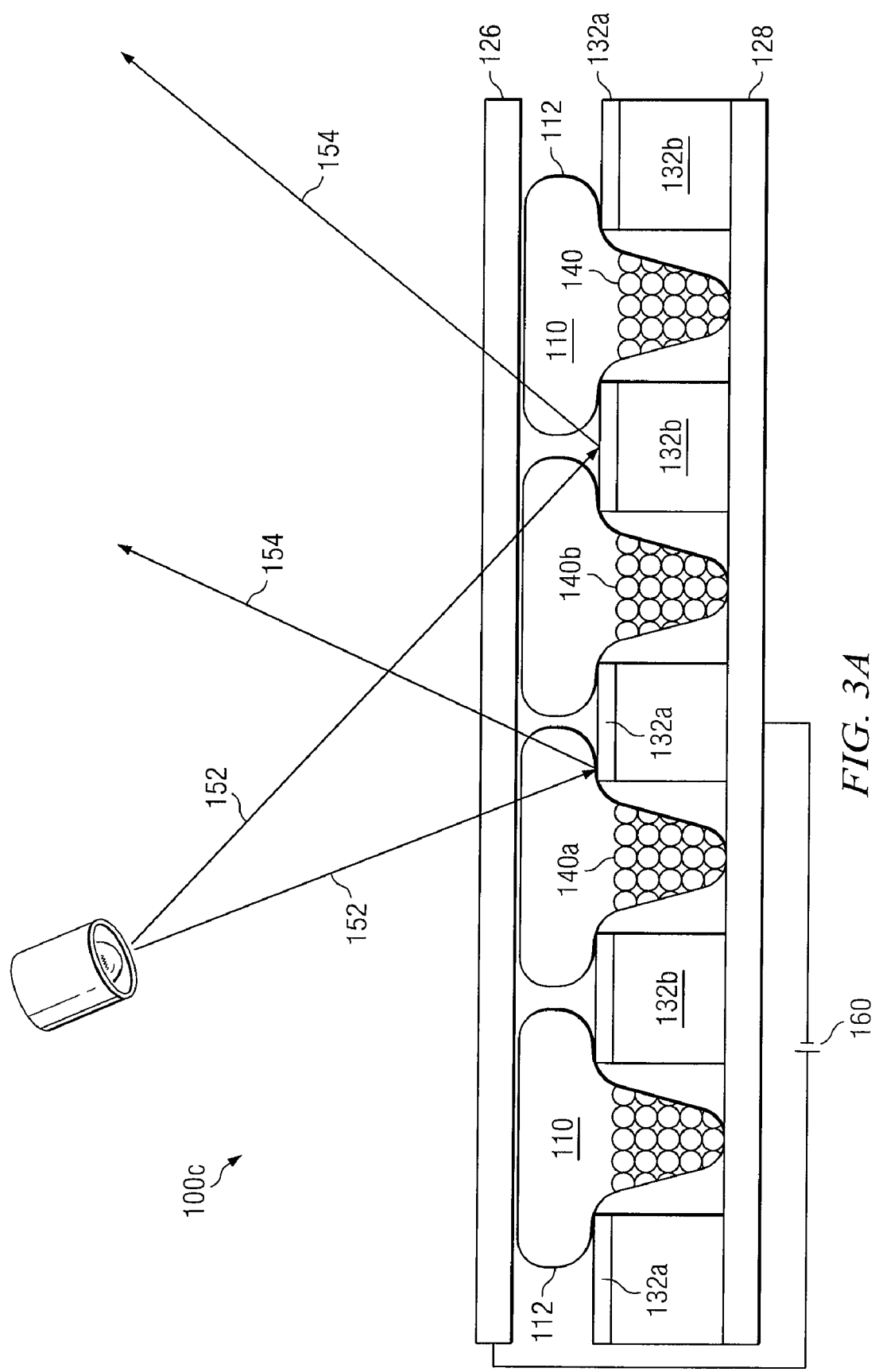
FIG. 3A is a side elevational view of an electrophoretic light modulator comprising an array of posts and capsules in which particles have collected between the posts, in accordance with particular embodiments.
Figure 3B:
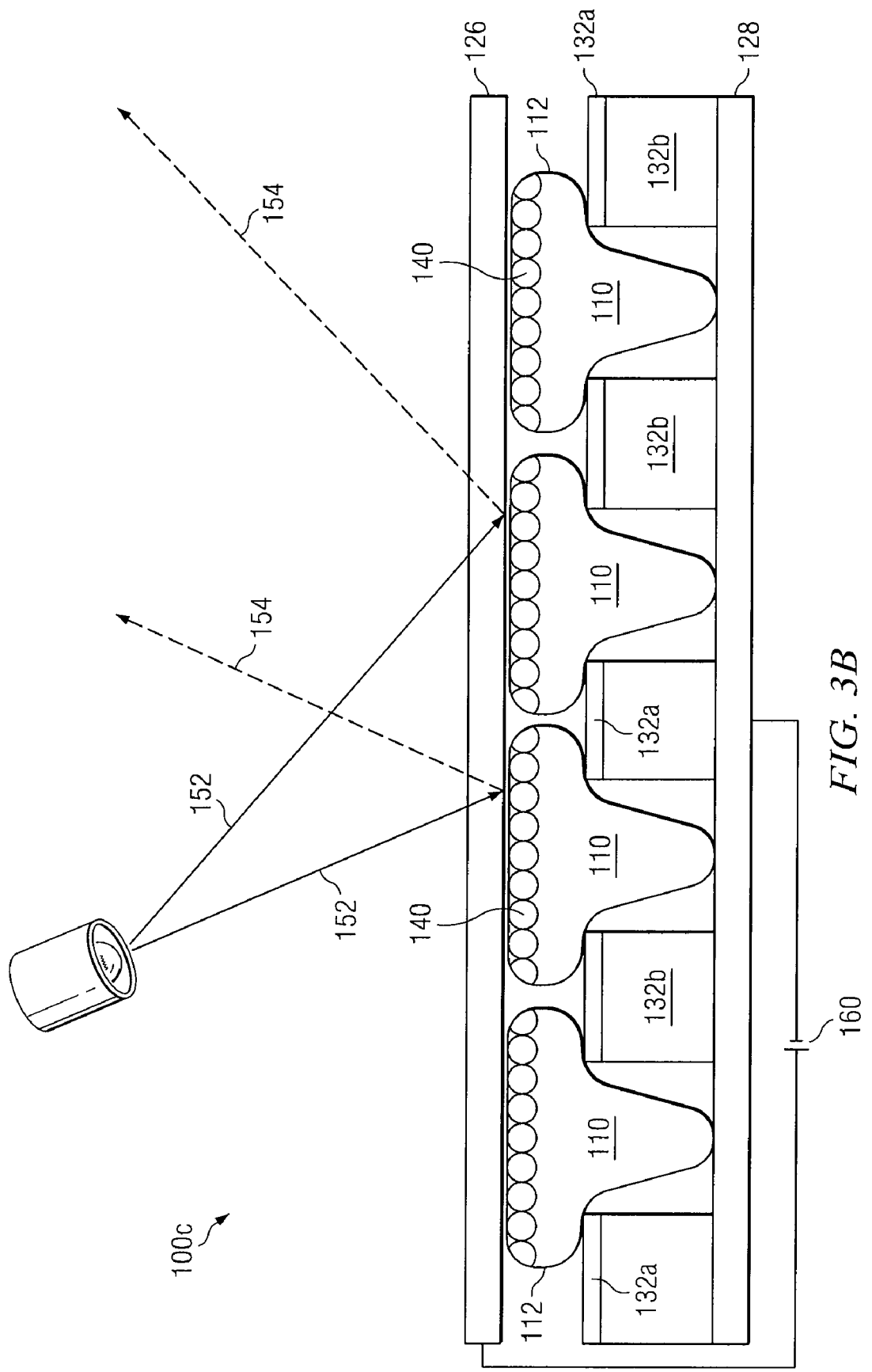
FIG. 3B is a side elevational view of the electrophoretic light modulator comprising an array of posts and capsules in which particles have collected above the posts, in accordance with particular embodiments.

FIGS. 3A and 3B are side elevational views of electrophoretic light modulator 100c comprising an array of posts 132 and capsules 112 in which particles 140 have collected between posts 132 (FIG. 3A) and above posts 132 (FIG. 3B), in accordance with particular embodiments. Electrophoretic light modulator 100c may be similar to electrophoretic light modulator 100b with the exception that electrophoretic fluid 110 may be contained by a plurality of capsules 112. Capsules 112 may comprise an optically transparent shell which encloses fluid 110 and particles 140.

In particular embodiments, capsules 112 may allow for particles 140 within a particular capsule 112 to be different than the particles within another capsule 112. The difference may be in the color of the respective particles. For example, particles 140a may be one color and particles 140b may be a different color.

In particular embodiments, the shape of capsules 112 may allow particles 140 to more easily move into the gaps between posts 132. More specifically, the rounded shape may better direct particles 140 into the gaps while avoiding the flat surfaces of posts 132. Furthermore, capsules 112 may allow for a more even distribution of particles 140. More specifically, capsules 112 may ensure that each gap receives an approximately equal number of particles 140. The use of capsules 112 may allow for a more robust and physically flexible light modulator.

Figure 4A:
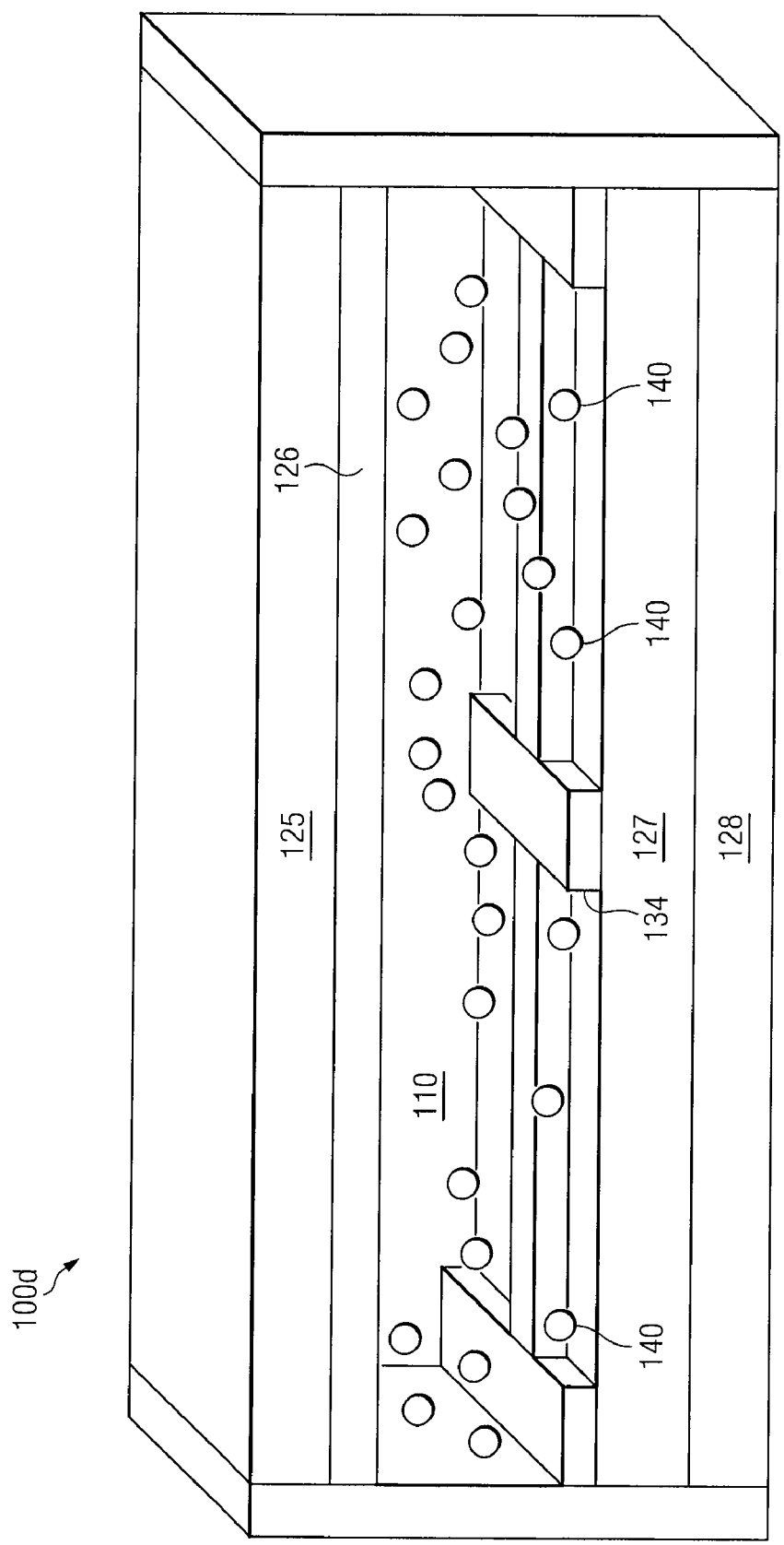
FIG. 4A is a perspective view an electrophoretic light modulator comprising a grid electrode, in accordance with particular embodiments.
Figure 4B:
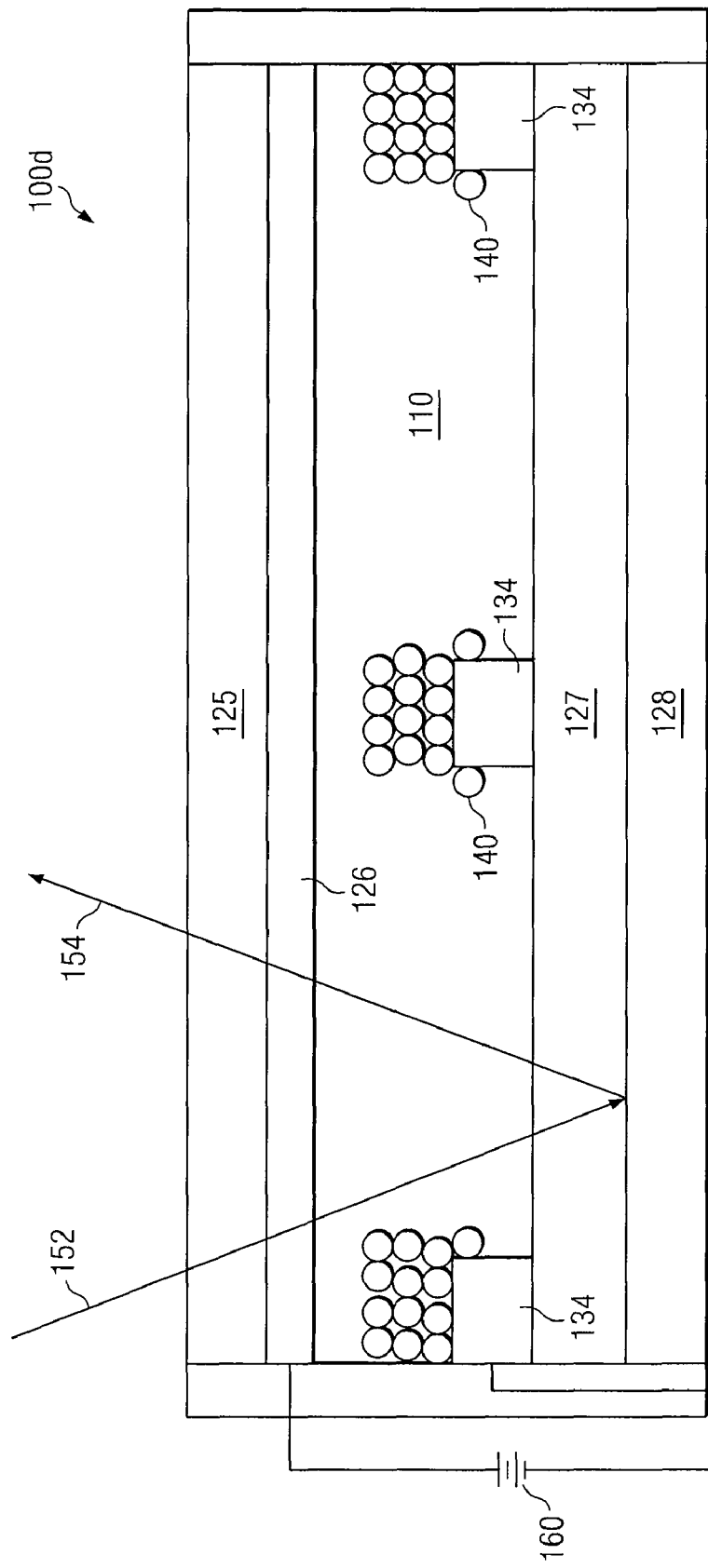
FIG. 4B is a side elevational view of the electrophoretic light modulator comprising a grid electrode in which particles have collected around the grid electrode, in accordance with particular embodiments.
Figure 4C:
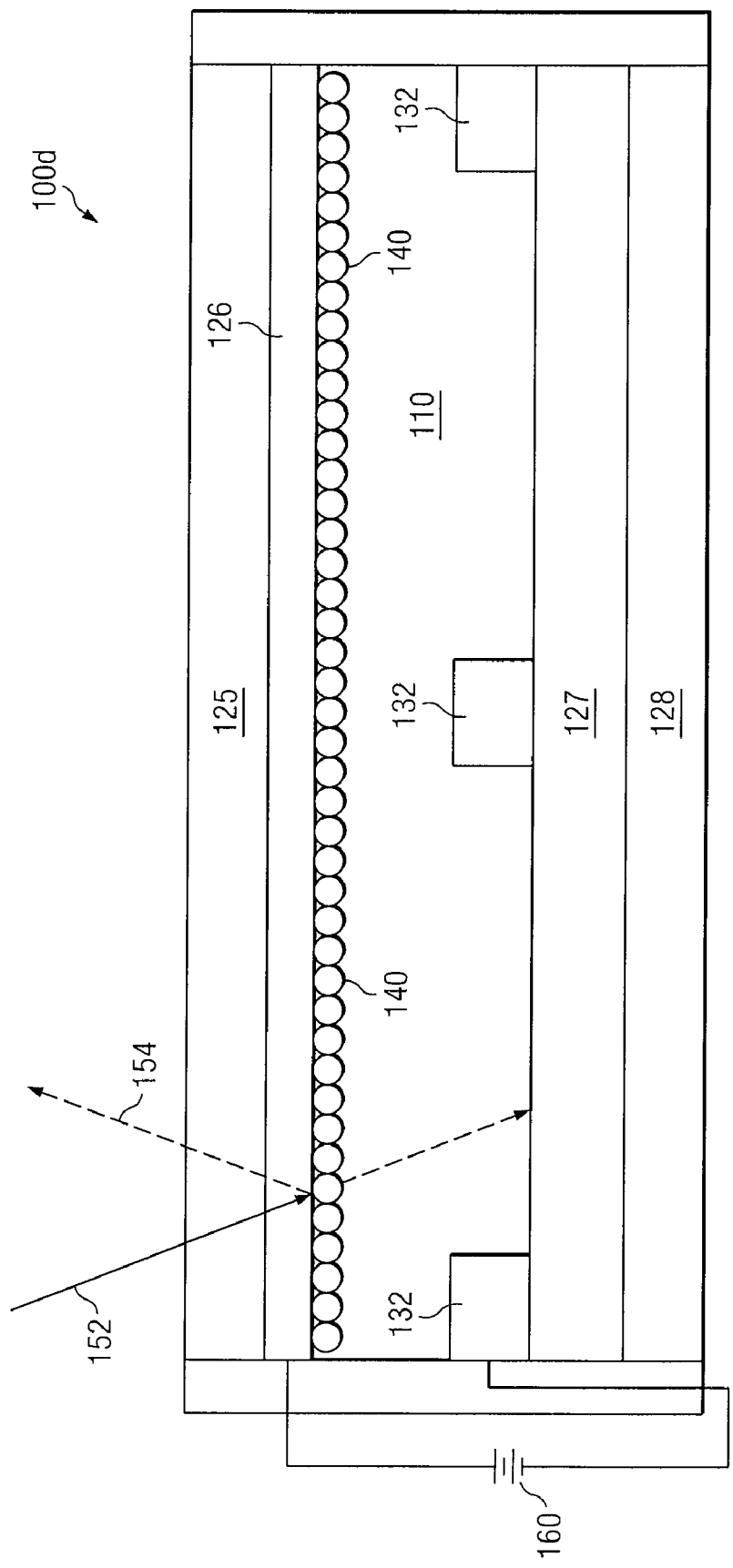
FIG. 4C is a side elevational view of the electrophoretic light modulator comprising a grid electrode in which particles have collected above the grid electrode, in accordance with particular embodiments.

FIGS. 4A-4C depict various views of a particular embodiment that uses a grid electrode. In particular, FIG. 4A is a perspective view electrophoretic light 100d modulator comprising grid electrode 134, in accordance with particular embodiments. In the depicted embodiment, light modulator 100d comprises upper and lower optically transparent layers 125 and 127, respectively, electrode grid 134, electrophoretic fluid 110, reflecting layer 128 and upper electrode 126. As with previous embodiments, suspended within fluid 110 may be a number of electrophortic particles 140 that migrate under the force of an electric field generated between electrode grid 134 and upper electrode 126. Thus, incident light 152 may be selectively reflected from various regions of optically reflecting layer 128. More specifically, as can be seen in FIGS. 4B and 4C (explained below), light modulator 100d may provide optical reflectance while particles 140 are collected around electrode grid 134 (FIG. 4B) and optical absorption while particles 140 are displaced along the surface of upper electrode 126 (FIG. 4C).

While in the particular embodiment shown, electrode grid 134 comprises a generally mesh-like structure, other embodiments may have any desired shape covering a relatively small portion of optically transparent layer 127. Electrode grid 134 may be formed of any suitable conductive material, such as aluminum or indium-tin-oxide. In particular embodiments, electrode grid 134 may be formed on optically transparent layer 127 using an optical lithography process. In certain embodiments, elongated sections of electrode grid 134 may be approximately 25 to 50 microns wide, and 0.1 to 3.0 microns thick. The pitch or distance between adjacent elongated sections may be approximately 200 to 2000 microns.

In particular embodiments, reflecting layer 128 may have a relatively high index of optical refraction such that it acquires high reflectivity by virtue of the refractive index discontinuity with optically transparent layer 127. In some embodiments, reflecting layer 128 may comprise a multilayer interference filter composed of a multilayer composite of materials designed to reflect light in a specific spectral band.

In particular embodiments, optically transparent layer 125 may help isolate upper electrode 126 from the environment. The material used for optically transparent layer 125 may be selected according to a desired optical range. For example, optically transparent layer 125 may be made of polyethlene terephthalate (PET) (e.g., a 0.012 to 4 millimeter thick layer of PET), or polyethylene (e.g., a 0.012 to 3 millimeter thick layer of polyethylene).

FIG. 4B is a side elevational view of electrophoretic light modulator 100d comprising grid electrode 134 in which particles 140 have collected around the grid electrode 134, in accordance with particular embodiments. In the depicted embodiment, light modulator 100d comprises upper and lower optically transparent layers 125 and 127, respectively, electrode grid 134, electrophoretic fluid 110, reflecting layer 128, upper electrode 126, and voltage source 160. Light modulator 100d is biased by voltage source 160 such that particles 140 have migrated towards electrode grid 134. Electrode grid 134 may cause particles 140 to aggregate together around the relatively small area occupied by electrode grid 134 thus exposing the majority of reflecting surface 128 to light 152. As with previous embodiments, the quality and characteristics of reflected light 154 may be based substantially on the characteristics of reflecting surface 128. For example, if it is desired for light modulator 100d to produce green reflected light 154, then reflecting surface 128 may be formed so as to reflect green light.

FIG. 4C is a side elevational view of electrophoretic light modulator 100d comprising grid electrode 134 in which particles 140 have collected above grid electrode 134, in accordance with particular embodiments. In the depicted embodiment, light modulator 100d comprises upper and lower optically transparent layers 125 and 127, respectively, electrode grid 134, electrophoretic fluid 110, reflecting layer 128, upper electrode 126, and voltage source 160. Light modulator 100d is biased by voltage source 160 such that particles 140 have migrated towards upper electrode 126. The attractive force between upper electrode 126 and the small repulsive forces between particles 140 may cause them to spread out along the entire lower surface of upper electrode 126. By creating, in essence, a relatively uniform layer of particles 140, reflecting layer 128 may effectively be obscured from light 152. Accordingly, in this state, the quality and characteristics of reflected light 154 may be based primarily on the characteristics of particles 140.

Light modulator 100d may be able to alternate between the two states depicted in FIGS. 4B and 4C by alternating the bias applied by the voltage source 160. For example, if reflecting layer 128 is highly reflective and particles 140 are optically absorbing then light modulator 100d may alternate between absorbing (FIG. 4C) and reflecting (FIG. 4B) light 152. More specifically, the bias applied in FIG. 4C may cause the optically absorbing particles 140 to spread out along the lower surface of upper electrode 126 effectively masking reflecting layer 128 to produce a dark or poorly reflecting state. Conversely, reversing the bias applied by voltage source 160 may cause particles 140 to cluster around electrode grid 134 effectively exposing the optically reflective reflecting layer 128 (see FIG. 4B). Thus, light modulator 100d is either poorly reflecting or highly reflecting. Voltage source 160 may switch between these states in a temporal fashion as needed using an appropriate temporal sequence of changes in electrical bias based on the desired intensity of the resulting reflected light 154.

In certain embodiments, the conductive characteristics of reflecting layer 128 may affect the electric field developed between upper electrode 126 and electrode grid 134. In particular embodiments, voltage source 160 may be connected to reflecting layer 128. This may allow reflecting layer 128 to operate as a guard to reduce electrostatic effects of stray electric fields surrounding light modulator 100d. In the guard arrangement, the voltage of reflecting layer 128 may be made equal to electrode grid 134 or upper electrode 126 to reduce any tendency for particles 140 to rest anywhere but on grid electrode 134 (when biased as depicted in FIG. 4B). In some embodiments, reflecting layer 128 may be biased with an opposite polarity so that when biased as depicted in FIG. 4C, particles 140 are repelled towards upper electrode 126.

Figure 5B:
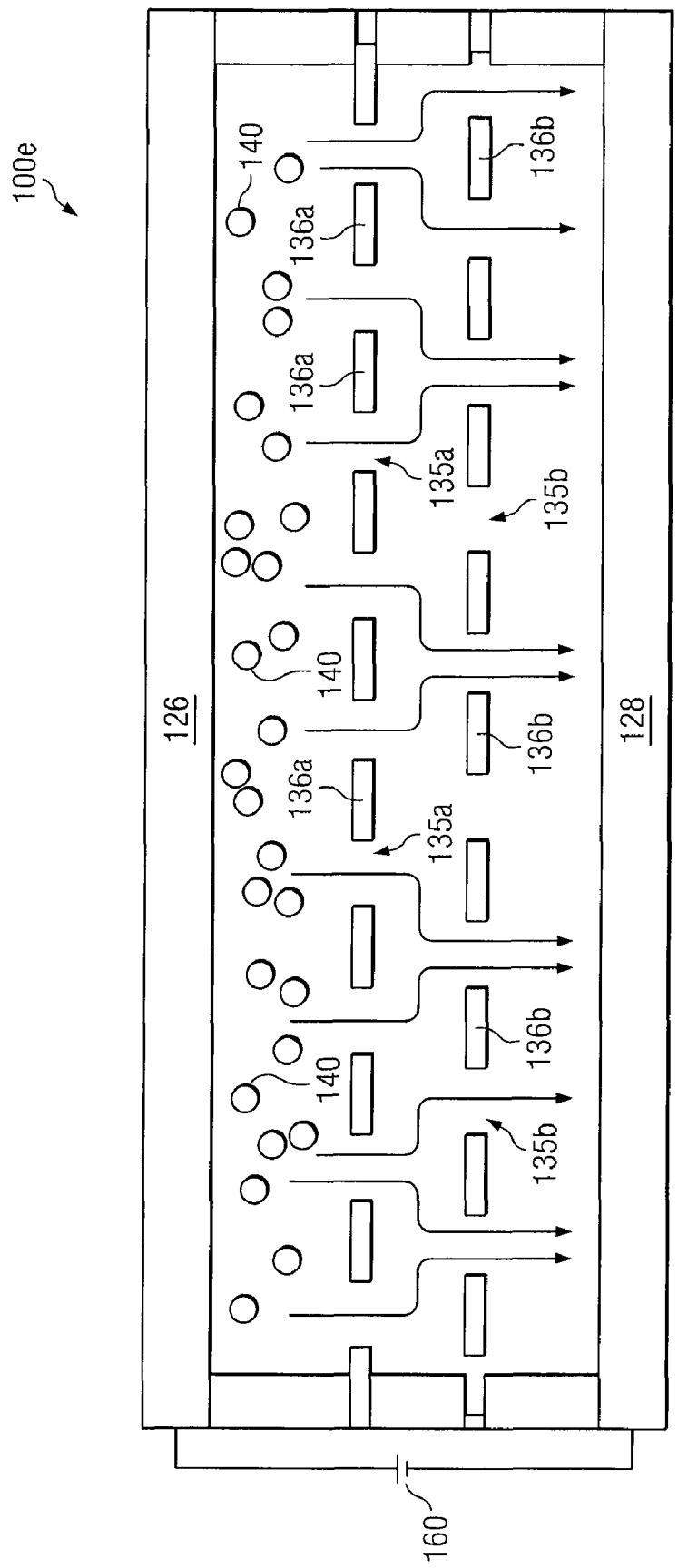
FIG. 5B is a side elevational view of the electrophoretic light modulator comprising two perforated sheets in which particles are moving under the perforated sheets, in accordance with particular embodiments.

FIGS. 5A-5B depict two different states of an electrophoretic light modulator that uses two reflecting sheets. In particular, FIG. 5A is a side elevational view of electrophoretic light modulator 100e comprising two perforated sheets 136 in which particles 140 are moving above perforated sheets 136, and in FIG. 5B particles 140 are moving below perforated sheets 136, in accordance with particular embodiments. Light modulator 100e may be similar to light modulator 100a with the exception that light modulator 100e uses two reflecting sheets 136 as opposed to a single reflecting sheet 132 in light modulator 100a. As in previous embodiments, upper electrode 126 may be optically transparent and both upper and lower electrodes 126 and 128 may be electrically conductive and able to hold a charge.

Similar to previous embodiments, particles 140 may be attracted or repelled towards one or the other of upper electrode 126 or lower electrode 128 based on the bias applied by voltage source 160. However, as mentioned above, in light modulator 100e, particles 140 may pass through two substantially parallel reflecting sheets 136. Perforations 135 in the two reflecting sheets may be arranged so that perforations 135a are located above the reflecting surface portions of reflecting sheet 136b. Thus, both reflecting sheet 136a and 136b may reflect light. More specifically, light 152 may be reflected by reflecting sheet 136a and light that passes through perforations 135a may be reflected by reflecting sheet 136b.

In particular embodiments, both reflecting sheets 136 may comprise similar optical characteristics (e.g., they may both be reflective or they may both be blue, etc.). This may allow for relatively large perforations 135 compared with the average size of particles 140 or perforations 135 in light modulator 100a. Reflecting sheet 136b may allow for the larger perforations 135a while still providing an efficient light modulator. For example, depending on the situation, the percentage of sheet 136 covered by perforations 135 may be as high as 50%. The relatively large ratio of perforations 135 may facilitate the transport of particles 140 through the two reflecting sheets 136.

In some embodiments, upper electrode 126, both reflecting sheets 136 and lower electrode 128 may all be substantially parallel to one another. In some embodiments, spacers may be used to maintain separation between the different layers. For example, the separation between upper electrode 126 and reflecting sheet 136a may be 5 to 25 micrometers; the separation between reflecting sheets 136a and 136b may be 5 to 25 micrometers; and the separation between reflecting sheet 136b and lower electrode 128 may be 5 to 25 micrometers. The actual separation between each layer need not be the same.

Figure 6:
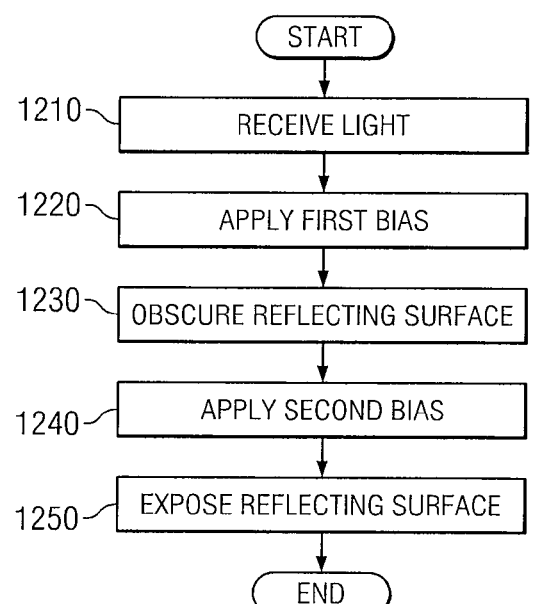
FIG. 6 is a flowchart depicting a method for modulating light, in accordance with particular embodiments.

FIG. 6 is a flowchart depicting a method for modulating light in accordance with particular embodiments. The method may be used with any of the embodiments depicted above in FIGS. 1 through 4. The method begins at step 1210 with the receipt of light from a light source. The light source may comprise, for example, the sun or artificial means such as an LED or a fluorescent light.

At step 1220 a first bias is applied to a pair of electrodes, such as, electrodes 126 and 128 depicted in FIG. 1B. The first bias may attract a plurality of charged particles. Depending on the polarity of the bias as well as the polarity particles, the particles may be attracted towards an upper or a lower electrode. For purposes of this method, it may be assumed that at step 1220 the bias that is applied attracts the charged particles to an upper electrode. As more of the charged particles become attracted to the upper electrode the repulsive electrical forces between particles may tend to cause the particles to spread out along the surface of the upper electrode. This has the effect of obscuring a reflecting surface at step 1230.

Because the charged particles tend to spread themselves out along the surface of the upper electrode the light that is received at step 1210 may be reflected or absorbed with characteristics based on the charged particles. For example, if the charged particles comprise an optically absorbing material then the light received at 1210 may be absorbed by the charged particles. As another example, if the charged particles comprise a particular color, for example blue, then the light received at step 1210 may be reflected as blue light.

At step 1240 a second bias is applied. The second bias may comprise an opposite polarity to the first bias applied at step 1220. This has the effect of attracting the plurality of charged particles towards the second electrode of the pair of electrodes. As the charged particles move towards the second electrode, they may expose the reflecting surface at step 1250. By exposing the reflecting surface at step 1250, the light received at step 1210 may be reflected with characteristics based on the characteristics of the reflecting surface. For example, if the reflecting surface is made out of a highly reflective material then the light received at step 1210 may be highly reflected. As another example, if the material used in the reflecting surface comprises a particular color, for example red, then the light received at step 1210 may be reflected as red light.

Some of the steps illustrated in FIG. 6 may be combined, modified, deleted, or rearranged where appropriate, and additional steps may also be added to the flowchart. For example, in some embodiments, the light modulator may switch between applying the first and second bias in response to an electrical signal indicative of the desired characteristics of the reflected light.

Although particular embodiments have been described in detail, it should be understood that various other changes, substitutions, combinations and alterations may be made hereto without departing from the spirit and scope of particular embodiments. For example, in particular embodiments, any of the modulators depicted herein may be formed of relatively flexible materials to form a relatively flexible light modulation device. Furthermore, although embodiments have been described with reference to a number of elements included within a light modulator, these elements may be combined, rearranged or positioned in order to accommodate particular modulation needs. The various embodiments contemplate great flexibility in the arrangement of these elements as well as their internal components. Furthermore, the materials and composition used for the elements of a light modulator may vary depending on the operational needs.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. An electrophoretic light modulator, comprising:
   an optically transparent upper electrode through which light can pass;
   a lower electrode;
   an enclosed volume between the upper electrode and the lower electrode;
   an optically transparent electrophoretic fluid within the enclosed volume;
   a voltage source coupled to the upper electrode and the lower electrode, the voltage source operable to apply a bias between the upper electrode and the lower electrode and further operable to switch between a first bias state and a second bias state;
   a plurality of electrophoretic particles suspended in the electrophoretic fluid, the electrophoretic particles configured to absorb the light and responsive to the bias applied between the upper electrode and the lower electrode; and
   a plurality of substantially parallel reflecting surfaces comprising a high index of optical refraction, each parallel reflecting surface is substantially parallel to at least one other parallel reflecting surface and to the upper electrode, at least one of the reflecting surfaces is between the upper electrode and the lower electrode and at least one of the parallel reflecting surfaces is electrically coupled to the lower electrode the plurality of reflecting surfaces arranged so that when the first bias state is applied between the upper electrode and the lower electrode the plurality of electrophoretic particles obscure the plurality of reflecting surface from the light to absorb at least portion of the light and when the second bias state is applied between the upper electrode and the lower electrode the plurality of electrophoretic particles expose the plurality of reflecting surfaces to the light to reflect at least a portion of the light.

2. The electrophoretic light modulator of claim 1, wherein at least one reflecting surface of the plurality of reflecting surfaces comprises a perforated surface within the enclosed volume that is substantially parallel to the upper electrode through which light passes, wherein the perforations are sized based on an average size of the plurality of electrophoretic particles.

3. The electrophoretic light modulator of claim 1, wherein at least one reflecting surface of the plurality of reflecting surfaces comprises a plurality of substantially coplanar reflecting surfaces, each reflecting surface coupled to the lower electrode via a post.

4. The electrophoretic light modulator of claim 3, wherein the plurality of substantially coplanar reflecting surfaces comprises at least three substantially coplanar reflecting surfaces, each reflecting surface coupled to the lower electrode via a different one of at least three posts, the at least three posts forming a plurality of channels into which the electrophoretic particles collect when the second bias state is applied between the upper electrode and the lower electrode.

5. The electrophoretic light modulator of claim 3, further comprising a plurality of capsules filled with a subset of the electrophoretic fluid and a subset of the plurality of electrophoretic particles, wherein each capsule of the plurality of capsules comprises:
   a first portion configured to fit between at least two posts supporting at least two reflecting surfaces of the plurality of coplanar reflecting surfaces; and
   a second portion configured to cover at least a portion of the at least two reflecting surfaces of the plurality of coplanar reflecting surfaces.

6. The electrophoretic light modulator of claim 1, further comprising a plurality of capsules filled with the electrophoretic fluid, each capsule comprising a subset of the plurality of electrophoretic particles.

7. The electrophoretic light modulator of claim 1, wherein the lower electrode comprises an electrode grid, the electrode grid comprising a plurality of intersecting electrodes that are substantially parallel with the upper electrode.

8. The electrophoretic light modulator of claim 1, wherein the first optical characteristic comprises an optically absorbent characteristic and the second optical characteristic comprises an optically reflective characteristic.

9. The electrophoretic light modulator of claim 1, wherein the lower electrode is located between the upper electrode and at least one reflecting surface of the plurality of reflecting surfaces, the lower electrode arranged in a grid pattern.

10. An electrophoretic light modulator, comprising:
    a pair of electrodes comprising a space there between;
    an optically transparent electrophoretic fluid within the space between the pair of electrodes;
    a plurality of electrically charged particles suspended in the electrophoretic fluid and configured to absorb light;
    a voltage source coupled to the pair of electrodes and operable to:
      generate a first bias attracting the charged particles towards a first electrode of the pair of electrodes; and
      generate a second bias attracting the charged particles towards a second electrode of the pair of electrodes; and
    a plurality of substantially parallel reflecting surfaces comprising a high index of optical refraction, each parallel reflecting surface is substantially parallel to at least one other parallel reflecting surface and to the upper electrode, at least one of the reflecting surfaces is between the upper electrode and the lower electrode and at least one of the parallel reflecting surfaces is electrically coupled to the lower electrode wherein the plurality of reflecting surfaces are obscured by the charged particles when the voltage source generates the first bias and the plurality of reflecting surfaces are exposed when the voltage source generates the second bias.

11. The electrophoretic light modulator of claim 10, wherein at least one reflecting surface of the plurality of reflecting surfaces comprises a perforated surface within the enclosed volume that is substantially parallel to one of the electrodes of the pair of electrodes, wherein the perforations are sized based on an average size of the plurality of electrically charged particles.

12. The electrophoretic light modulator of claim 10, wherein at least one reflecting surface of the plurality of reflecting surfaces comprises a plurality of substantially coplanar reflecting surfaces, each reflecting surface coupled to an electrode of the pair of electrodes via a post.

13. The electrophoretic light modulator of claim 10, further comprising a plurality of capsules filled with the electrophoretic fluid, each capsule comprising a subset of the plurality of charged particles.

14. The electrophoretic light modulator of claim 10, wherein one electrode of the pair of electrodes comprises an electrode grid, the electrode grid comprising a plurality of intersecting electrodes that are substantially parallel with the other electrode of the pair of electrodes.

15. The electrophoretic light modulator of claim 10, wherein the first optical characteristic comprises an optically absorbent characteristic and the second optical characteristic comprises an optically reflective characteristic.

16. An electrophoretic light modulator, comprising:
an optically transparent electrophoretic fluid;
a plurality of similarly charged particles each configured to absorb light, the particles suspended in the optically transparent electrophoretic fluid;
a plurality of substantially parallel reflecting surfaces comprising a high index of optical refraction; and
a pair of electrodes that create an electric field that causes the plurality of charged particles to obscure or expose the plurality of reflecting surfaces based on the polarity of the electric field, wherein each parallel reflecting surface is substantially parallel to at least one other parallel reflecting surface and to the pair of electrodes, at least one of the reflecting surfaces is between the pair of electrodes and at least one of the parallel reflecting surfaces is electrically coupled to one of the pair of electrodes.

17. The electrophoretic light modulator of claim 16, wherein at least one reflecting surface of the plurality of reflecting surfaces comprises a perforated surface situated between, and substantially parallel with, the pair of electrodes, wherein the perforations are sized based on an average size of the plurality of charged particles.

18. The electrophoretic light modulator of claim 16, wherein at least one reflecting surface of the plurality of reflecting surfaces comprises a plurality of substantially coplanar reflecting surfaces situated between the pair of electrodes, each reflecting surface coupled to one of the electrodes of the pair of electrodes via a post.

19. The electrophoretic light modulator of claim 16, further comprising a plurality of capsules filled with an electrophoretic fluid, the electrophoretic fluid within each capsule suspending a subset of the plurality of charged particles.

20. The electrophoretic light modulator of claim 16, wherein one electrode of the pair of electrodes comprises an electrode grid, the electrode grid comprising a plurality of intersecting electrodes that are substantially parallel with the other electrode of the pair of electrodes.

21. The electrophoretic light modulator of claim 16, wherein the first optical characteristic comprises an optically absorbent characteristic and the second optical characteristic comprises an optically reflective characteristic.

22. A method of modulating light, comprising:
receiving light from a light source;
attracting a plurality of charged electrophoretic particles towards a first electrode of two electrodes by applying a first bias between the two electrodes, the plurality of charged electrophoretic particles suspended in an optically transparent fluid and configured to absorb the light;
obscuring a plurality of substantially parallel reflecting surfaces having a high index of optical refraction and that are substantially parallel to at least one other parallel reflecting surface and to first electrode, at least one of the reflecting surfaces is between the first electrode and a second electrode and at least one of the parallel reflecting surfaces is electrically coupled to the second electrode, the plurality of reflecting surfaces are obscured from the received light by attracting the charged electrophoretic particles to the first electrode;
attracting the plurality of charged electrophoretic particles towards the second electrode of the two electrodes by applying a second bias between the two electrodes; and
exposing the reflecting surface to the received light by attracting the particles to the second electrode.

23. The method of claim 22, further comprising switching between applying the first bias and the second bias.

24. An electrophoretic light modulator, comprising:
an optically transparent upper electrode through which light can pass;
a lower electrode;
an enclosed volume between the upper electrode and the lower electrode;
an optically transparent electrophoretic fluid within the enclosed volume;
a voltage source coupled to the upper electrode and the lower electrode, the voltage source operable to apply a bias between the upper electrode and the lower electrode and further operable to switch between a first bias state and a second bias state;
a plurality of electrophoretic particles suspended in the electrophoretic fluid, the electrophoretic particles configured to absorb the light and responsive to the bias applied between the upper electrode and the lower electrode; and
a plurality of substantially parallel reflecting surfaces comprising a high index of optical refraction, the reflecting surfaces arranged so that when the first bias state is applied between the upper electrode and the lower electrode the plurality of electrophoretic particles obscure the reflecting surfaces from the light to absorb at least portion of the light and when the second bias state is applied between the upper electrode and the lower electrode the plurality of electrophoretic particles expose the reflecting surface to the light to reflect at least a portion of the light, wherein:
each parallel reflecting surface is substantially parallel to at least one other parallel reflecting surface;
each parallel reflecting surface is substantially parallel to the upper electrode and the lower electrode;
each parallel reflecting surface is between the upper electrode and the lower electrode;

each parallel reflecting surface comprises a plurality of perforations; and
a first plurality of perforations of a first reflecting surface of the plurality of reflecting surfaces are offset from a second plurality of perforations of a second reflecting surface of the plurality of reflecting surfaces such that light passing through a perforation of the first reflecting surface at a substantially perpendicular angle to the first reflecting surface will be reflected by the second reflecting surface.

* * * * *